United States Patent
Mueller et al.

(10) Patent No.: US 12,312,177 B2
(45) Date of Patent: May 27, 2025

(54) D-SHAPED BELT WITH FLANGES

(71) Applicant: Fenner, Inc., Harrisburg, PA (US)

(72) Inventors: Nathaniel E. Mueller, Lebanon, PA (US); Ryan P. Flattery, Marietta, PA (US)

(73) Assignee: FENNER, INC., Harrisburg, PA (US)

( * ) Notice: Subject to any disclaimer, the term of this patent is extended or adjusted under 35 U.S.C. 154(b) by 79 days.

(21) Appl. No.: 18/149,282

(22) Filed: Jan. 3, 2023

(65) Prior Publication Data

US 2023/0211955 A1    Jul. 6, 2023

Related U.S. Application Data

(60) Provisional application No. 63/266,335, filed on Jan. 3, 2022.

(51) Int. Cl.
| | | |
|---|---|---|
| *B65G 13/07* | (2006.01) | |
| *B29D 29/10* | (2006.01) | |
| *F16G 1/16* | (2006.01) | |

(52) U.S. Cl.
CPC .............. *B65G 13/07* (2013.01); *F16G 1/16* (2013.01); *B29D 29/10* (2013.01)

(58) Field of Classification Search
None
See application file for complete search history.

(56) References Cited

U.S. PATENT DOCUMENTS

| | | | | |
|---|---|---|---|---|
| 3,650,375 | A | * | 3/1972 | Fleischauer ............ B65G 13/07 474/167 |
| 3,902,589 | A | * | 9/1975 | Bylsma .................. B65G 13/04 198/790 |
| 4,070,919 | A | | 1/1978 | Ummen et al. |
| 4,468,211 | A | * | 8/1984 | Hoshiro .................. F16H 7/023 474/205 |
| 4,484,903 | A | | 11/1984 | Schneider |
| 4,856,644 | A | * | 8/1989 | Reist .......................... F16H 7/18 198/716 |
| 4,887,707 | A | * | 12/1989 | Harms .................. B65G 47/263 198/781.03 |
| 5,074,406 | A | * | 12/1991 | Gundlach .............. B65G 23/06 198/834 |
| 5,101,966 | A | * | 4/1992 | Lapeyre .................. B65G 17/08 198/803.14 |
| 5,105,937 | A | * | 4/1992 | Gundlach .............. B65G 17/08 198/840 |
| 9,643,788 | B2 | * | 5/2017 | Steinert .................. B65G 15/60 |
| 10,626,546 | B2 | * | 4/2020 | Knox ....................... D01F 11/16 |
| 10,687,468 | B1 | * | 6/2020 | Wood ...................... B65G 15/36 |
| 2001/0019936 | A1 | | 9/2001 | Hayashi |
| 2010/0059343 | A1 | | 3/2010 | Uchida et al. |

* cited by examiner

*Primary Examiner* — Kavel Singh
(74) *Attorney, Agent, or Firm* — Shumaker, Loop & Kendrick, LLP; James D. Miller

(57) ABSTRACT

A drive belt for use in a roller assembly includes a main body having a radially inwardly extending arcuate portion, a first flanged portion projecting axially from a first end of the arcuate portion, and a second flanged portion projecting axially from a second end of the arcuate portion. At least one reinforcement is embedded within the main body. The first and second flanged portions of the main body are configured to prevent a rolling of the main body during operation of the drive belt when received within a groove of a rotary component.

19 Claims, 3 Drawing Sheets

D-SHAPED BELT WITH FLANGES

CROSS-REFERENCE TO RELATED APPLICATION

This patent application claims priority to U.S. Provisional Patent Application Ser. No. 63/266,335, filed on Jan. 3, 2022, the entire disclosure of which is hereby incorporated herein by reference.

FIELD OF THE INVENTION

The present invention relates to a belt for transmitting rotational motion, and more particularly, to a reinforced and D-shaped belt having laterally extending flanges for preventing a rolling of the belt during operation thereof.

BACKGROUND OF THE INVENTION

Various different types of belts may be utilized for transferring rotational motion. One such application may be transferring the rotational motion of one roller to another with respect to a roller or conveyer assembly, such as may be used to support and convey a workpiece during a manufacturing process. Each belt may be wrapped around two of the rollers with the belt received within a circumferentially extending groove or indentation formed in each of the respective rollers.

One type of belt typically used for such roller assemblies is an O-ring having a circular cross-sectional shape formed into a closed loop. As shown in FIG. 1, the circular shape of the O-ring belt may be received partially within a semi-circular groove formed in one of the rollers when the O-ring belt is tensioned over the roller. The circular cross-sectional shape provides a benefit in that a rolling of the O-ring belt, as may occur due to an axial misalignment between the rollers associated with the O-ring belt, does not negatively affect operation of the roller assembly due to the axial symmetry of the circular cross-sectional shape. That is, the same relationship is present between the O-ring belt and the groove regardless of the rotation of the O-ring belt.

However, the circular cross-sectional shape of the O-ring belt provides certain disadvantages that must be accounted for in selecting such a belt. For example, the circular cross-sectional shape of the O-ring belt is typically manufactured by forming material into a cylindrical shape, such as by extruding the circular cross-sectional shape along a length, before welding or otherwise joining the opposing ends of the cylindrical shape into a loop. This process results in the formation of a seam where the opposing ends meet, which may be a point of weakness of the resulting belt. Additionally, the need to join the opposing ends of the belt results in the inability to reinforce the belt via the inclusion of internal and longitudinally extending reinforcing members disposed within the cross-section of the belt. Specifically, the opposing ends of the reinforcing elements cannot be joined to each other via the welding process used to join the base material of the O-ring belt, thereby presenting a discontinuous reinforcement at the position of the seam.

One solution to these concerns may include the formation of a semi-circular or D-shaped belt such as that disclosed in FIG. 2, which can more easily and quickly be produced via injection or spin cast equipment, each of which allows for the formation of a full loop in the absence of an end seam as well as the inclusion of longitudinally extending reinforcing members. However, as shown in FIG. 3, it has been discovered that an undesired rolling of the D-shaped belt results in an immediate disengagement between the belt and the roller, which directly and instantaneously affects the power transmission capabilities of the roller assembly.

Thus, it is desirable to provide a belt that can be easily and quickly manufactured, capable of being reinforced along a length of the belt in the absence of a seam, and configured to prevent an incidence of rolling of the belt when received within a groove of a corresponding roller.

SUMMARY OF THE INVENTION

In concordance and agreement with the instant disclosure, a new and improved drive belt for a roller or conveyer assembly has surprisingly been discovered.

According to an embodiment of the invention, a drive belt for use in a roller assembly includes a main body comprising a radially inwardly extending arcuate portion, a first flanged portion projecting axially from a first end of the arcuate portion, and a second flanged portion projecting axially from a second end of the arcuate portion.

According to another embodiment of the invention, a roller assembly comprises a first roller having a circumferentially extending groove formed in an outer circumferential surface thereof, the groove defined by a groove forming surface indented radially inwardly into the outer circumferential surface of the first roller, and a drive belt configured to transfer motion between the first roller and the drive belt when a portion of the drive belt is received within the groove and engaging the groove forming surface of the first roller. The drive belt comprises a main body having a radially inwardly extending arcuate portion, a first flanged portion projecting axially from a first end of the arcuate portion, and a second flanged portion projecting axially from a second end of the arcuate portion.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein.

DETAILED DESCRIPTION OF THE PREFERRED EMBODIMENT

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

FIGS. 4-9 illustrate a drive belt 10 according to an embodiment of the present invention. The drive belt 10 as shown and described herein may be utilized in a roller or conveyer assembly 2 including a first roller (pulley) 3 and a second roller (pulley) 4 (FIG. 9), wherein rotational motion is transferred from one of the rollers 3, 4 to the other of the rollers 3, 4 via a tensioning of the drive belt 10 therearound. However, it should be apparent to one skilled in the art that the drive belt 10 as shown and described herein may be configured for use in any of a variety of different mechanisms utilizing the transfer of rotational motion while appreciating the beneficial features of the drive belt 10 as described hereinafter. It should also be readily understood that the drive belt 10 may be tensioned about three or more of the rollers for transferring motion between any combination of the associated rollers, such as tensioning a single drive belt 10 around three different rollers having axes of rotation arranged into a triangular configuration. It should also be understood that any number of the drive belts 10 may be utilized for transferring motion between any number of the associated rollers, including the use of multiple drive belts 10 at different axial positions along the rollers, as desired.

Figure 1:
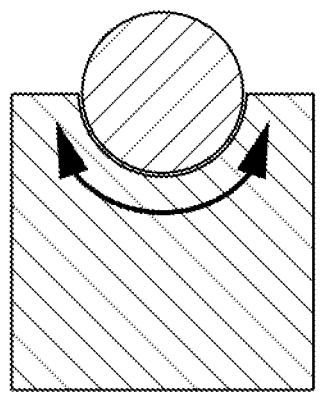
FIG. 1 is a fragmentary cross-sectional side elevational view showing an O-ring drive belt rolling within a groove of a rotary component.
Figure 2:
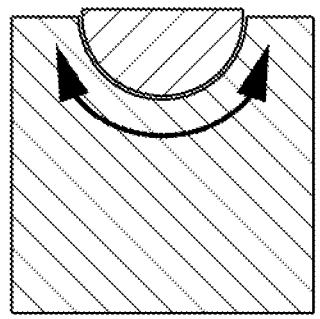
FIG. 2 is a fragmentary cross-sectional side elevational view showing a D-shaped drive belt disposed within a groove of a rotary component.
Figure 3:
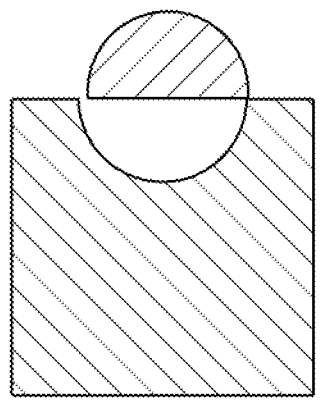
FIG. 3 is a fragmentary cross-sectional side elevational view showing the D-shaped drive belt after rolling within the groove of the rotary component.
Figure 4:
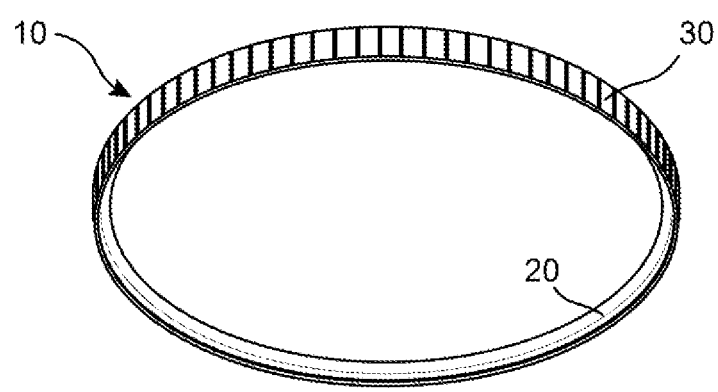
FIG. 4 is a bottom perspective view of a drive belt according to an embodiment of the present invention.
Figure 5:
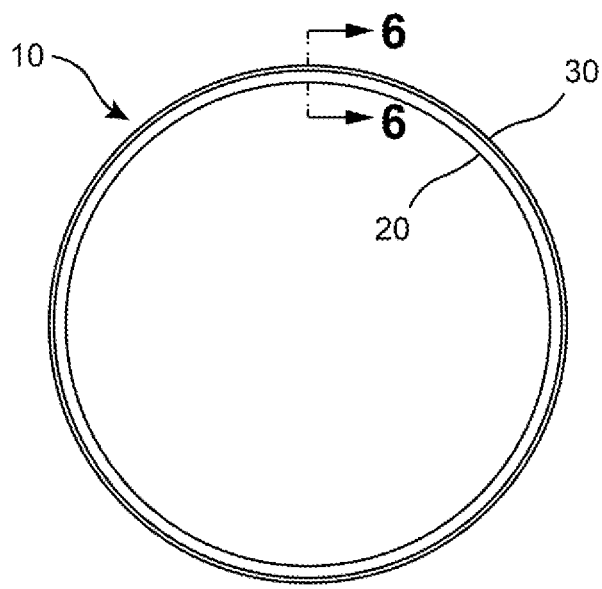
FIG. 5 is a top plan view of the drive belt of FIG. 4.
Figure 6:
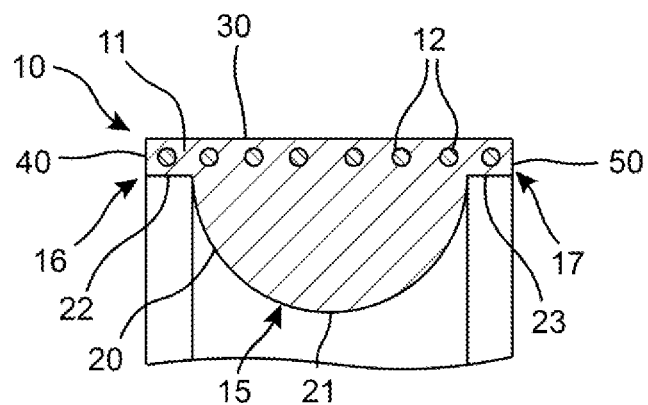
FIG. 6 is an enlarged fragmentary cross-sectional view of the drive belt as taken from the perspective of section lines 6-6 of FIG. 5.

As shown in FIGS. 4 and 5, the drive belt 10 may be manufactured to include an axially symmetric configuration including a constant cross-section extended circumferentially into a circular loop shape. The circular loop shape may correspond to a normal configuration of the drive belt 10 when not subjected to any form of tension or other deformation. The drive belt 10 may be formed from a first material comprising a main body 11 of the drive belt 10 and a second material comprising at least one reinforcing member 12 of the drive belt 10. As shown in FIG. 6, each of the at least one reinforcing members 12 may be disposed within the cross-section of the main body 11, and each of the at least one reinforcing members 12 may be disposed at a position wherein the corresponding reinforcing member 12 is spaced apart from an outer surface of the main body 11. The first material and the second material are different materials having differing material properties and characteristics. The second material may be selected to include any one of a greater tensile strength, a greater tensile stiffness, and/or a greater resistance to shearing, among other properties, in comparison to the first material in order to provide reinforcement to the drive belt 10. In some embodiments, the reinforcing members 12 may be configured to carry a majority of a tensile load of the drive belt 10.

The drive belt 10 may beneficially be manufactured using spin casting equipment or injection molding equipment to avoid the formation of a seam within the drive belt 10. Such manufacturing processes also provide the advantage of reducing the production time necessary in manufacturing each drive belt 10 in comparison to the methods described in forming an O-ring belt as discussed in the background section of the present patent application. For example, the welding of the opposing ends of the O-ring belt has been found to be a comparatively time-consuming process.

Figure 9:
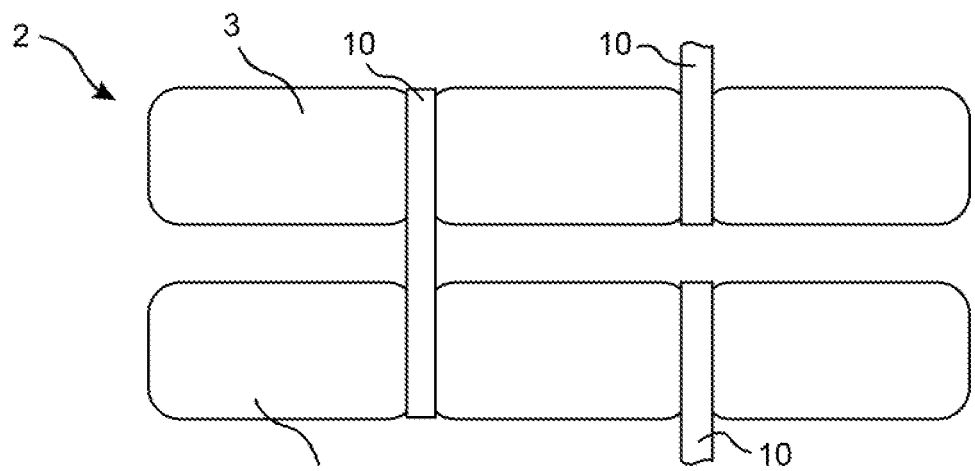
FIG. 9 is a top plan view of a roller assembly utilizing a plurality of the drive belts for transferring rotational motion between a plurality of rollers of the roller assembly.

Such a manufacturing process may include the introduction of the first material into a suitable mold following the placement of the second material at the desired locations within the mold to imbed the second material within the first material. The first material and the second material may each include some degree of flexibility with respect to a direction perpendicular to the circumferential direction of the looped drive belt 10 to ensure that the drive belt 10 can be flexed away from the circular looped configuration for tensioning the drive belt 10 to a specific configuration, such as around a pair of rollers as depicted in FIG. 9, or around any number or arrangement of rollers as contemplated hereinabove.

The first material may be a moldable polymeric material that is substantially flexible and configured for use in transferring rotational motion in the manner described herein, such as an elastomeric material, or the like. The second material may be any material suitable for reinforcing the first material in the manner described herein, such as metallic materials like steel or polymeric materials such as Kevlar, polyester, nylon, fiberglass, or carbon steel, as non-limiting examples. Alternative material combinations may be utilized while remaining within the scope of the present invention.

The main body 11 of the drive belt 10 includes an inner circumferential surface 20, an outer circumferential surface 30, a first end surface 40, and a second end surface 50. The inner circumferential surface 20 is configured to face towards and engage an outer surface of a secondary component such as one of the rollers 3, 4 while the outer circumferential surface 30 is arranged opposite the inner circumferential surface 20. The end surfaces 40, 50 connect the inner and outer circumferential surfaces 20, 30 at the opposing axial ends of the drive belt 10. As used herein, the axial direction of the drive belt 10 refers to a direction arranged parallel to the axis of rotation of any secondary components associated with the transfer of rotational motion of the drive belt 10 (such as the rollers 3, 4), wherein such an axis extends between the described end surfaces 40, 50.

The cross-section of the drive belt 10 includes an arcuate portion 15, a first flanged portion 16, and a second flanged portion 17. The arcuate portion 15 is positioned centrally with respect to the axial direction of the drive belt 10, the first flanged portion 16 is formed at a first axial end of the drive belt 10 including the first end surface 40, and the second flanged portion 17 is formed at a second axial end of the drive belt 10 including the second end surface 50. The arcuate portion 15 projects radially inwardly relative to the straddling first and second flanged portions 16, 17.

The arcuate portion 15 includes an arcuate surface 21 forming a centrally disposed segment of the inner circumferential surface 20. The arcuate surface 21 is convex in shape and is configured for engagement with each of the secondary components utilized in conjunction with the drive belt 10, such as said rollers 3, 4. The arcuate surface 21 may be a secant of a circular shape, such as a semi-circular shape, as the arcuate surface 21 extends between the opposing flanged portions 16, 17. In other words, the arcuate surface 21 may include a constant radius of curvature as the arcuate surface 21 extends between the oppositely arranged flanged portions 16, 17. However, alternative arcuate shapes may be utilized without necessarily departing from the scope of the present invention, including arcuate shapes having a variable radius of curvature to that of a circular arc. For example, the arcuate surface 21 may include a semi-elliptical or hyperbolic arcuate shape without necessarily departing from the scope of the present invention.

The first flanged portion 16 includes a first axial surface 22 forming another segment of the inner circumferential surface 20. The first axial surface 22 extends axially between the first end surface 40 and a first end of the arcuate surface 21. The first axial surface 22 is configured to face inwardly and to engage each of the secondary components engaging the drive belt 10. The second flanged portion 17 similarly includes a second axial surface 23 forming another segment of the inner circumferential surface 20. The second axial surface 23 extends axially between the second end surface 50 and a second end of the arcuate surface 21. The second axial surface 23 is configured to face inwardly and to engage each of the secondary components engaging the drive belt 10 at a position opposite that of the first axial surface 22. The outer circumferential surface 30 is arranged in the axial direction of the drive belt 10, and may be arranged parallel to each of the axial surfaces 22, 23 of the flanged portions 16, 17.

The first axial surface 22 cooperates with the arcuate surface 21 to form a first concave indentation in the inner circumferential surface 20 at the intersection between the surfaces 21, 22 while the second axial surface 23 similarly cooperates with the arcuate surface 21 to form a second concave indentation in the inner circumferential surface 20 at the intersection between the surfaces 21, 23. In the illustrated embodiment, the arcuate surface 21 is arranged substantially perpendicular to each of the first axial surface 22 and the second axial surface 23 where the arcuate surface 21 intersects each respective axial surface 22, 23. However, alternative angles of inclination greater than 90 degrees may be utilized as the angle present between the arcuate surface 21 and each respective axial surface 22, 23, such as when the arcuate portion 21 corresponds to an arc of less than 180 degrees of angular extension. In the present embodiment, each of the concave indentations includes a sharp edge where the respective surfaces 21, 22, 23 meet to result in a radius of curvature of zero present between the intersecting surfaces 21, 22, 23. However, in other embodiments, each of the concave indentations may include an arcuate contour having a radius of curvature greater than zero, as desired, for connecting the arcuate surface 21 to each adjoining axial surface 22, 23 absent the formation of the edge therebetween.

The main body 11 may alternatively be described as including a radially outer portion having a rectangular cross-sectional shape and a radially inner portion having a semi-circular cross-sectional shape, a semi-elliptical cross-sectional shape, or the cross-sectional shape of a segment of a circle, wherein the radially inner portion projects radially inwardly from the radially outer portion. The radially outer portion may also be said to extend axially beyond the radially inner portion at each axial end thereof and accordingly includes a greater axial length than the radially inner portion. The radially outer portion accordingly includes the portions of the main body 11 disposed radially outwardly of the axial surfaces 22, 23 while the radially inner portion includes the portions of the main body 11 including and disposed radially inwardly of the axial surfaces 22, 23.

The one of the spin casting manufacturing process or the injection molding manufacturing process utilized in forming the drive belt 10 may include the formation of the main body 11 in the absence of an undercut between the arcuate portion 15 and either of the first flanged portion 16 or the second flanged portion 17. That is, no portion of the inner circumferential surface 20 extends axially and/or radially to a position disposed directly radially inwardly of another portion of the inner circumferential surface 20 to be arranged radially outwardly facing, and especially not at either intersection of the arcuate portion 15 with either of the flanged portions 16, 17, such at the edge where the arcuate surface 21 intersects each of the axially extending surfaces 22, 23. This configuration is particularly well suited for the formation of the main body 11 during utilization of either of the described manufacturing methods as the material forming the main body 11 can more readily flow to form all of the structural features described as being formed therein.

In the illustrated embodiment, each of the at least one reinforcing members 12 is positioned immediately adjacent the outer circumferential surface 30 in what is identified above as the rectangular shaped radially outer portion of the main body 11, including at least some of the reinforcing members 12 disposed within each of the flanged portions 16, 17. The reinforcing members 12 are spaced from one another with respect to the axial direction of the drive belt 10, as measured between the opposing ends 40, 50. However, other positions may be selected for the reinforcing members 12 within the main body 11 while remaining within the scope of the present invention, including multiple rows of the reinforcing members 12, or offset arrangements of the reinforcing members 12, as desired. The reinforcing members 12 are also not excluded from inclusion within the inner portion/arcuate portion 15 of the drive belt 10.

Figure 7:
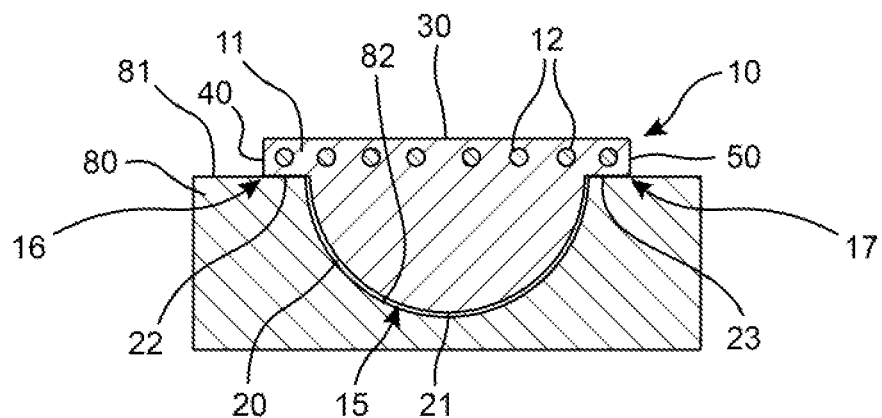
FIG. 7 is a fragmentary cross-sectional side elevational view of the drive belt of FIG. 4 when received within a semi-circular groove of a rotary component.

FIG. 7 illustrates the drive belt 10 when engaged with a secondary component 80, which again may be representative of one of the rollers 3, 4 of FIG. 9. The secondary component 80 includes an outer circumferential surface 81 having a groove 82 formed therein, wherein the groove 82 is defined by a groove forming surface indented radially inwardly relative to the outer circumferential surface 81. The outer circumferential surface 81 extends in an axial direction of the drive belt 10 while the groove 82 of FIG. 7 has a shape corresponding to the shape of the arcuate surface 21, which in the present case is a semi-circular shape. The engagement of the drive belt 10 with the secondary component 80 includes reception of the arcuate portion 15 within the groove 82 and engagement between the outer circumferential surface 81 and each of the flanged portions 16, 17. More specifically, in the provided example, the axial surfaces 22, 23 of the flanged portions 16, 17 each engage the outer circumferential surface 81 adjacent the opposing axial ends of the groove 82 while the arcuate surface 21 is nested/received within and engages the arcuate surface formed by the groove 82.

The engagement of the flanged portions 16, 17 with the outer circumferential surface 81 advantageously prevents an incidence of undesired rolling of the drive belt 10 within the groove 82, such as may occur if a minor axial misalignment is present within the roller assembly having the drive belt 10. As can be seen in FIG. 7, a rolling of the drive belt 10 in either rotational direction results in one of the flanged portions 16, 17 engaging the outer circumferential surface 81 in a manner preventing further rolling, thereby ensuring that power transmission is not undesirably lost when such a condition would otherwise tend to occur.

Figure 8:
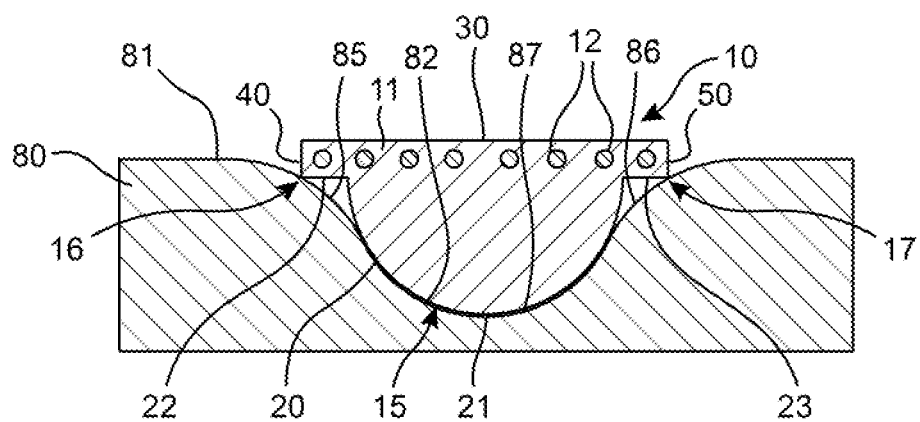
FIG. 8 is a fragmentary cross-sectional side elevational view of the drive belt of FIG. 4 when received within a groove of another rotary component having a centrally disposed concave surface straddled by outwardly disposed and oppositely arranged convex surfaces.

The secondary component 80 is not limited to the configuration shown in FIG. 7. As shown in FIG. 8, each of the grooves 82 formed in the secondary component 80 may be formed to include a curved surface at each axial end of the groove 82 where the semi-circular shape of the groove 82 transitions to the axially extending outer surface 81. Such a configuration may result from cold rolling each of the grooves 82 into the outer circumferential surface 81 of the secondary component 80.

As shown in FIG. 8, such a cold rolled groove 82 may be defined by a groove forming surface including a first convex surface 85, a second convex surface 86, and a concave surface 87. Specifically, the groove forming surface includes the first convex surface 85 merging with the outer circumferential surface 81 at the first axial end of the groove forming surface, the second convex surface 86 merging with the outer circumferential surface 81 at the second axial end of the groove forming surface, and the concave surface 87 centrally disposed and connecting the first convex surface 85 to the second convex surface 86. The concave surface 87 connects the straddling convex surfaces 85, 86 and includes an arcuate shape corresponding to that of the arcuate portion 15 of the drive belt 10, such as having the shape of a secant of a circle.

If the configuration shown in FIG. 8 is used, each of the axial surfaces 22, 23 of the flanged portions 22, 23 is positioned to engage the secondary component 80 along the corresponding convex surface 85, 86 of the groove 82 while the arcuate surface 21 of the arcuate portion 15 is positioned to engage the concave surface 87. An entirety of the main body 11 may be disposed axially between the first axial end and the second axial end of the groove forming surface when the drive belt 10 is engaging the corresponding secondary component 80. However, the illustrated configuration is not limiting, as the drive belt 10 may be adapted to include a configuration similar to that shown in FIG. 7 where each of the flanged portions 16, 17 may extend axially to an extent wherein each of the axial surfaces 22, 23 at least partially engages the axially extending outer circumferential surface 81, as desired.

An attempt to rotate the drive belt 10 away from the configuration shown in FIG. 8 with respect to either rotational direction will result in one of the flanged portions 16, 17 immediately bearing against the corresponding one of the convex surfaces 85, 86 to prevent such rotation. Specifically, an edge where each of the axially extending surfaces 22, 23 meets the corresponding one of the axial end surfaces 40, 50 may first bear against the corresponding convex surface 85, 86 in a manner wherein any continued rotation of the drive belt 10 would result in an even greater extent of the corresponding axially extending surface 22, 23 bearing against the corresponding convex surface 85, 86 and preventing additional rotation.

The configuration of the main body 11 relative to the groove 82 of FIG. 8 also results in the drive belt 10 having a reduced radial profile relative to the outer circumferential surface 81 in comparison to a traditional O-ring. In fact, the radially outer portion may be produced with a radial height such that the outer circumferential surface 30 may be disposed radially inwardly of the outer circumferential surface 81 when received within the groove 82, as desired. In any event, the reduced radial extension of the drive belt 10 away from the outer and exposed surface of the corresponding secondary component 80 results in a reduction of the space occupied by the components forming the roller assembly 2, which may allow for a tighter packaging of the roller assembly 2, or to a reduction in interference between the drive belts 10 and any proximately disposed components.

Referring again to FIG. 9, each of the rollers or pulleys 3, 4 associated with the roller assembly 2 may be associated with one or more of the drive belts 10 for transferring motion among various different components. The presence of the flanged portions 16, 17 prevents an incidence of rolling of each of the drive belts 10 within the corresponding groove 82 in the event that an axial misalignment occurs between the rollers 3, 4, or any other such disruption, thereby ensuring that power transmission is not interrupted. More specifically, the roller assembly 2 may include the rotational motion of the first roller 3 about an axis of rotation thereof being transferred to the second roller 4 by one of the drive belts 10, or alternatively may include the rotational motion of the second roller 4 transferred to the first roller 3. One or more of the rollers 3, 4 may be driven to rotate about the respective axis of rotation thereof by a suitable rotary actuator, thereby allowing for the transfer of the rotary motion of the rotary actuator to another one of the rollers via one of the drive belts 10. Any number of the rollers and the drive belts in accordance with the present disclosure may be utilized in the corresponding roller assembly 2 while remaining within the scope of the present invention.

The advantages of the drive belt 10 having the flanged portions 16, 17 extending from an arcuate portion 15 have been confirmed experimentally. Specifically, it has been proven through testing that the flanged portions 16, 17 prevent a rolling of the drive belt 10. A 24 hour dynamometer test with both flanged portions and regular D-shaped belts was performed. The rollers/pulleys associated with the test were then misaligned to promote rolling of the drive belts. All the belts without flanged portions rolled within the first minute of testing while the belts with the flanged portions ran for the duration of the test.

Experiments were also performed to prove that the reinforcement offered by the inclusion of the reinforcement members 12 within the main body 11 promotes more power transmission. A dynamometer test was performed to ramp the torque then compare the slip percentages, wherein the D-Shaped and flanged parts having the reinforcements perform much greater than a standard O-ring. The experiment also looked at different types of reinforcements and indicated that regardless of the reinforcement, the performance is better than a corresponding O-ring.

In addition to improved torque transmission, the reinforcement of the drive belt also aids in tensile decay of the drive belt. This results in a drive belt that performs better for a longer period.

In addition to each of the described structural advantages, the disclosed drive belt 10 may also be produced easily and efficiently in a desired manufacturing process that is devoid of the need to join the opposing ends of the resulting loop while also providing the opportunity to introduce circumferentially uninterrupted reinforcement members into the resulting loop. The disclosed shape is efficiently formed by the described processes while also preventing an incidence of undesired rotation of the drive belt 10 relative to the groove into which it is received when installed into a corresponding roller assembly.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A drive belt for use in a roller assembly, the drive belt comprising:
   a main body having a constant cross-sectional shape extended circumferentially into a closed and continuous loop such that the constant cross-sectional shape is present at all circumferential positions disposed along the loop formed by the main body, wherein an axial direction of the main body is arranged perpendicular to the circumferential direction of extension of the constant cross-sectional shape with respect to all circumferential positions disposed along the loop formed by the main body, and wherein a radial direction of the main body at each of the respective circumferential positions disposed along the loop formed by the main body is arranged perpendicular to each of the axial direction of the main body and the circumferential direction of the main body at the corresponding circumferential position disposed along the loop formed by the main body, and wherein the constant cross-sectional shape present at each of the respective circumferential positions along the loop formed by the main body is disposed along a plane defined by the axial direction of the main body and the radial direction of the main body at the corresponding circumferential position disposed along the loop formed by the main body, the constant cross-sectional shape comprising:

an inner circumferential surface of the main body including a radially inwardly extending arcuate portion, a first flanged portion projecting axially away from a first axial end of the arcuate portion, and a second flanged portion projecting axially away from a second axial end of the arcuate portion.

2. The drive belt of claim 1, further comprising at least one reinforcement embedded within the main body.

3. The drive belt of claim 1, wherein the drive belt is formed in one of a spin casting manufacturing process or an injection molding manufacturing process.

4. The drive belt of claim 3, wherein the one of the spin casting manufacturing process or the injection molding manufacturing process includes a first material formed into a configuration of the main body with a second material forming a reinforcement embedded within the main body.

5. The drive belt of claim 3, wherein the one of the spin casting manufacturing process or the injection molding manufacturing process includes the arcuate portion disposed radially inwardly of the first flanged portion and the second flanged portion.

6. The drive belt of claim 5, wherein the one of the spin casting manufacturing process or the injection molding manufacturing process includes the formation of the constant cross-sectional shape of the main body in the absence of an axially extending undercut disposed directly between the arcuate portion and either of the first flanged portion or the second flanged portion with respect to the axial direction.

7. The drive belt of claim 1, wherein the main body includes a radially inner portion including the arcuate portion and a radially outer portion including the first flanged portion and the second flanged portion.

8. The drive belt of claim 7, wherein the radially inner portion has a semi-circular or semi-elliptical cross-sectional shape and the radially outer portion has a rectangular cross-sectional shape.

9. The drive belt of claim 8, wherein a plurality of reinforcements are embedded within the radially outer portion of the main body.

10. The drive belt of claim 9, wherein the constant cross-sectional shape of the main body includes the plurality of the reinforcements spaced apart from one another with respect to the axial direction of the main body.

11. The drive belt of claim 7, wherein the constant cross-sectional shape of the main body is devoid of an axially extending undercut disposed directly between the radially inner portion and the radially outer portion.

12. The drive belt of claim 1, wherein the constant cross-sectional shape of the main body includes the inner circumferential surface thereof having a first axially extending surface formed along the first flanged portion, an arcuate surface formed along the arcuate portion, and a second axially extending surface formed along the second flanged portion.

13. A roller assembly comprising:
a first roller having a circumferentially extending groove formed in an outer circumferential surface thereof, the groove defined by a groove forming surface indented radially inwardly into the outer circumferential surface of the first roller; and
a drive belt configured to transfer motion between the first roller and the drive belt when a portion of the drive belt is received within the groove and engaging the groove forming surface of the first roller, the drive belt comprising a main body having a constant cross-sectional shape extended circumferentially into a closed and continuous loop loop such that the constant cross-sectional shape is present at all circumferential positions disposed along the loop formed by the main body, wherein an axial direction of the main body is arranged perpendicular to the circumferential direction of extension of the constant cross-sectional shape with respect to all circumferential positions disposed along the loop formed by the main body, and wherein a radial direction of the main body at each of the respective circumferential positions disposed along the loop formed by the main body is arranged perpendicular to each of the axial direction of the main body and the circumferential direction of the main body at the corresponding circumferential position disposed along the loop formed by the main body, and wherein the constant cross-sectional shape present at each of the respective circumferential positions along the loop formed by the main body is disposed along a plane defined by the axial direction of the main body and the radial direction of the main body at the corresponding circumferential position disposed along the loop formed by the main body, the constant cross-sectional shape of the main body having a radially inwardly extending arcuate portion, a first flanged portion projecting axially away from a first axial end of the arcuate portion, and a second flanged portion projecting axially away from a second axial end of the arcuate portion.

14. The roller assembly of claim 13, further comprising a second roller, wherein the drive belt is further configured to transfer motion between the second roller and the drive belt.

15. The roller assembly of claim 14, wherein a first end of the loop formed by the circumferential extension of the constant cross-sectional shape of the main body is received around the first roller and a second end of the loop formed by the circumferential extension of the constant cross-sectional shape of the main body is received around the second roller.

16. The roller assembly of claim 14, wherein the drive belt is configured to transfer rotational motion of the first roller to the second roller.

17. The roller assembly of claim 13, wherein the groove forming surface includes a first convex surface merging with the outer circumferential surface of the first roller at a first axial end of the groove forming surface, a second convex surface merging with the outer circumferential surface of the first roller at a second axial end of the groove forming surface, and a concave surface connecting the first convex surface to the second convex surface.

18. The roller assembly of claim 17, wherein the arcuate portion of the constant cross-sectional shape of the main body is configured to engage the concave surface of the groove forming surface, the first flanged portion of the constant cross-sectional shape of the main body is configured to engage the first convex surface of the groove forming surface, and the second flanged portion of the constant cross-sectional shape of the main body is configured to engage the second convex surface of the groove forming surface.

19. The roller assembly of claim 17, wherein an entirety of the constant cross-sectional shape of the main body is disposed axially between the first axial end and the second axial end of the groove forming surface when received therein.

* * * * *